United States Patent
Morino et al.

(10) Patent No.: US 9,540,013 B2
(45) Date of Patent: Jan. 10, 2017

(54) HYDRAULIC CONTROL SYSTEM FOR VEHICLE

(71) Applicant: TOYOTA JIDOSHA KABUSHIKI KAISHA, Toyota-shi (JP)

(72) Inventors: Takuro Morino, Toyota (JP); Shuji Moriyama, Toyota (JP); Yoshio Ito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 19 days.

(21) Appl. No.: 14/429,220

(22) PCT Filed: Oct. 9, 2012

(86) PCT No.: PCT/JP2012/076104
§ 371 (c)(1),
(2) Date: Mar. 18, 2015

(87) PCT Pub. No.: WO2014/057531
PCT Pub. Date: Apr. 17, 2014

(65) Prior Publication Data
US 2015/0232102 A1    Aug. 20, 2015

(51) Int. Cl.
*F16H 61/00*    (2006.01)
*B60W 30/192*    (2012.01)
(Continued)

(52) U.S. Cl.
CPC ............ *B60W 30/192* (2013.01); *B60W 10/02* (2013.01); *B60W 10/06* (2013.01); *B60W 30/20* (2013.01);
(Continued)

(58) Field of Classification Search
CPC .............................................. F16H 2061/0034
See application file for complete search history.

(56) References Cited

U.S. PATENT DOCUMENTS

| | | | | |
|---|---|---|---|---|
| 4,364,343 A | * | 12/1982 | Malik | ................... F02D 41/042 123/179.16 |
| 6,258,008 B1 | * | 7/2001 | Tabata | ................... B60K 6/365 477/107 |

(Continued)

FOREIGN PATENT DOCUMENTS

| | | |
|---|---|---|
| JP | 2010-151229 A | 7/2010 |
| JP | 2011-004449 A | 1/2011 |
| WO | WO 2013/076825 A1 | 5/2013 |

OTHER PUBLICATIONS

International Search Report issued Dec. 25, 2012 in PCT/JP2012/076104 Filed Oct. 9, 2012.

*Primary Examiner* — Tisha Lewis
(74) *Attorney, Agent, or Firm* — Oblon, McClelland, Maier & Neustadt, L.L.P.

(57) ABSTRACT

A hydraulic control system for vehicle includes: an engine; an oil pump driven by the engine; a clutch device brought into engagement to enable power transmission between the engine and drive wheels by delivering a pressurized fluid thereto, and brought into disengagement to interrupt the power transmission between the engine and the drive wheels by discharging the fluid therefrom; and an accumulator storing the fluid delivered to the clutch device. The hydraulic control system is configured to control the hydraulic pressure applied to the clutch device, to stop the engine while bringing the clutch device into disengagement upon satisfaction of a predetermined stopping condition, and to restart the engine while bringing the clutch device into engagement upon satisfaction of a predetermined restarting condition. In the hydraulic control system, a hydraulic circuit increases flow rate of the fluid flowing between the accumulator and the clutch device when the engine is stopped.

4 Claims, 5 Drawing Sheets

(51) Int. Cl.
*B60W 30/20* (2006.01)
*F16D 48/02* (2006.01)
*B60W 10/02* (2006.01)
*B60W 10/06* (2006.01)

(52) U.S. Cl.
CPC ......... F16D 48/02 (2013.01); *B60W 2030/203* (2013.01); *B60W 2030/206* (2013.01); *F16D 2048/0203* (2013.01); *F16D 2048/0221* (2013.01); *F16D 2048/0257* (2013.01); *Y10T 477/71* (2015.01)

(56) References Cited

U.S. PATENT DOCUMENTS

2010/0210413 A1* 8/2010 Yokokawa ............. B60W 10/11
   477/40
2011/0174107 A1* 7/2011 Shimizu .............. F16H 61/0031
   74/473.11
2011/0319227 A1* 12/2011 Kamada ................ B60W 10/06
   477/83
2014/0296032 A1   10/2014 Morino et al.

* cited by examiner

HYDRAULIC CONTROL SYSTEM FOR VEHICLE

TECHNICAL FIELD

The present invention relates generally to a hydraulic control system for automatically stopping and starting an engine of a vehicle in operation to reduce fuel consumption and emissions. More particularly, the present invention relates to a hydraulic control system configured to control actuation of a clutch selectively connecting the engine to drive wheels when stopping and starting the engine.

BACKGROUND ART

In recent years, so-called "stop and start" control (abbreviated as "S & S" control hereinafter) of an engine has been adapted to reduce fuel consumption and emissions of automobiles. Under the S & S control, the engine is automatically stopped and restarted upon satisfaction of predetermined conditions. For example, the engine is stopped when an accelerator pedal is returned, and restarted when a brake pedal is returned.

However, when stopping or restarting the engine by the S & S control, an output torque of the engine would be varied significantly and hence a powertrain would be vibrated by such torque fluctuation. In order to reduce such vibrations, a clutch disposed between the engine and drive wheels is brought into disengagement to interrupt power transmission therebetween when stopping or restarting the engine by the S & S control. The clutch will be brought into engagement to allow power transmission between the engine and the drive wheels after the engine is restarted.

Basically, the above-mentioned clutch is actuated hydraulically by a mechanical pump driven by the engine. That is, the pump is also stopped when restarting the stopping engine and hence the hydraulic pressure is unavailable to actuate the clutch. Therefore, an optional accumulator is required to deliver hydraulic pressure to the clutch even when the engine is stopped by the S & S control.

One example of a vehicle drive device using such accumulator is described in JP-A-2010-151229. According to the teachings of JP-A-2010-151229, the accumulator is connected through a solenoid valve to a first oil passage of a hydraulic circuit connecting a shift valve to a forward clutch. A shut-off valve is also disposed on the first oil passage between the shift valve and a connection point with a second oil passage that is also connected to the accumulator. The solenoid valve opens the second oil passage just before activating the pump and closes the second oil passage just before inactivating the pump. The first oil passage is closed by the shut-off valve when delivering oil to the forward clutch from the accumulator.

JP-A-2010-151229 also describes a bypass passage extending parallel to the second passage to circumvent an orifice on the second oil passage, and a one-way valve disposed on the bypass passage to allow the oil to flow only toward the forward clutch.

According to the teachings of JP-A-2010-151229, the oil can be delivered promptly to the forward clutch from the accumulator through the bypass passage having the one-way valve when restarting the engine while using hydraulic pressure stored in the accumulator. By contrast, when the pump is driven by the engine, the oil is delivered from the pump to the accumulator through the second oil passage having the orifice. In this situation, since the oil is delivered through the orifice, the oil is stored into the accumulator slowly. That is, hydraulic pressure generated by the pump can be delivered promptly to the forward clutch when the engine is restarted and the pump is thereby activated. For this reason, the accumulator can be downsized.

According to the teachings of JP-A-2010-151229, however, the hydraulic pressure delivered to the forward clutch may not be returned to the accumulator smoothly. For example, given that a shift position of a transmission is shifted from a drive (D) position to a neutral position, the forward clutch has to be promptly brought into disengagement. However, the drive position would not be shifted smoothly from the D position to the N position if it takes too long to depressurize the forward clutch.

Such disadvantage may be solved by arranging a one-way clutch on the bypass passage taught by JP-A-2010-151229 to allow the oil to flow from the forward clutch only toward the accumulator. In this case, the forward clutch is allowed to be promptly brought into disengagement by returning the oil smoothly from the forward clutch to the accumulator. However, by contrast, it may take time to deliver the oil from the accumulator to the forward clutch to bring the forward clutch into engagement. Consequently, an engagement response of the forward clutch would be slowed when restarting the engine.

Alternatively, the time period to pressurize or depressurize the forward clutch may also be reduced by increasing the diameter of the orifice formed on the oil passage to the forward clutch. However, if the orifice is diametrically expanded to improve hydraulic response, vibrations and pulses of the oil caused by the solenoid valve would not be suppressed by the orifice and would propagate to the forward clutch. Consequently, controllability of the forward clutch would be degraded.

With the conventional hydraulic control system taught in the art, there still remains a need for improving hydraulic response to actuate the clutch device quickly and smoothly when automatically stopping and starting the engine.

DISCLOSURE OF THE INVENTION

The present invention has been conceived noting the technical problems thus far described, and it is therefore an object of the present invention is to provide a hydraulic control system for vehicle configured to promptly actuate a clutch device in conjunction with automatically stopping and starting an engine by the S & S control.

The hydraulic control system of the present invention is comprised of: an engine; an oil pump driven by the engine to generate hydraulic pressure; a clutch device that is brought into engagement to enable power transmission between the engine and drive wheels by delivering a pressurized fluid thereto, and brought into disengagement to interrupt the power transmission between the engine and the drive wheels by discharging the fluid therefrom; and an accumulator storing the fluid delivered to the clutch device. Specifically, the hydraulic control system is configured: to control the hydraulic pressure established by the oil pump or the accumulator serving as a hydraulic source to be delivered and discharged to/from the clutch device, to stop the engine while bringing the clutch device into disengagement upon satisfaction of a predetermined stopping condition, and to restart the engine while bringing the clutch device into engagement upon satisfaction of a predetermined restarting condition. In order to achieve the above-explained objective, according to the present invention, the hydraulic control system is provided with a hydraulic circuit configured to increase flow rate of the fluid flowing between the hydraulic source and the clutch device when the engine is stopped, in comparison with that of the case in which the engine is activated.

According to one aspect of the invention, the hydraulic circuit is comprised of: a first passage always connecting the hydraulic source to the clutch device to allow the fluid to be delivered from the hydraulic source to the clutch device, and to be discharged from the clutch device; a second passage selectively connecting the hydraulic source to the clutch device to allow the fluid to be delivered from the hydraulic source to the clutch device, and to be discharged from the clutch device; and an on-off valve adapted to close the second passage when the engine is activated, and to open the second passage when the engine is stopped to establish a communication between the hydraulic source and the clutch device through the first passage and the second passage.

According to another aspect of the invention, the hydraulic circuit is comprised of: a first passage always connecting the hydraulic source to the clutch device to allow the fluid to be delivered from the hydraulic source to the clutch device, and to be discharged from the clutch device; a second passage selectively connecting the hydraulic source to the clutch device to allow the fluid to be delivered from the hydraulic source to the clutch device, and to be discharged from the clutch device; and a solenoid valve adapted to close the second passage when the engine is activated, and to open the second passage when restarting the stopping engine while bringing the clutch device into disengagement to establish a communication between the hydraulic source and the clutch device through the first passage and the second passage.

The vehicle to which the hydraulic control system is applied is provided with an automatic transmission in which a drive position and a neutral position are selectable. Specifically, the solenoid valve opens the second passage when a shift position of the transmission is shifted from the drive position to the neutral position.

According to another aspect of the invention, the hydraulic circuit is comprised of: a diametrically smaller passage for delivering the fluid from the hydraulic source to the clutch device and discharging the fluid from the clutch device on which a first orifice is formed; a diametrically larger passage for delivering the fluid from the hydraulic source to the clutch device and discharging the fluid from the clutch device on which a second orifice that is diametrically larger than the first orifice is formed; and a change valve adapted to close the diametrically larger passage when the engine is activated while establishing a communication between the hydraulic source and the clutch device through the diametrically smaller passage, and to close the diametrically smaller passage when the engine is stopped while establishing a communication between the hydraulic source and the clutch device through the diametrically larger passage.

According to the present invention, when the engine is stopped by the S & S control, the accumulator serves as the hydraulic source to control the clutch device instead of the oil pump driven by the engine. In this case, in the hydraulic control system, the flow rate of the fluid flowing between the hydraulic source and the clutch device is increased to actuate the clutch device. According to the present invention, therefore, the clutch device is allowed to be brought into engagement by delivering the fluid amply thereto from the accumulator even if the engine is stopped. In addition, the fluid can also be discharged amply from the clutch device so that the clutch device can be bought into disengagement quickly. Thus, the hydraulic response of the clutch device can be improved. By contrast, when the engine is activated, the clutch device is hydraulically controlled by the oil pump. According to the present invention, therefore, the clutch device can be actuated promptly not only when the engine is activated but also when the engine is stopped.

Specifically, when the engine is stopped automatically, the hydraulic source is connected to the clutch device through the second passage in addition to the first passage always providing a connection therebetween. That is, when the engine is activated, the hydraulic source is connected to the clutch device only through the first passage. By contrast, when the engine is stopped automatically, the hydraulic source is connected to the clutch device not only through the first passage but also through the second passage. According to the present invention, therefore, hydraulic response of the clutch device can be improved when the engine is inactivated by allowing the fluid to be delivered to the clutch device through the two delivery lines, without degrading the hydraulic response of the clutch device of the case in which the engine is activated. In addition, the communication between the hydraulic source and the clutch device through the second passage is established only by actuating the on-off valve. Therefore, the delivery line between the hydraulic source and the clutch device through the second passage can be established smoothly without interrupting the connection therebetween through the first passage.

According to another aspect of the present invention, when the stopping engine is restarted, and when the clutch device is brought into disengagement, the hydraulic source is also connected to the clutch device through the second passage in addition to the first passage always providing a connection therebetween. That is, when the engine is activated, the hydraulic source is connected to the clutch device only through the first passage. By contrast, when the stopping engine is restarted, and when the clutch device is brought into disengagement, the hydraulic source is connected to the clutch device not only through the first passage but also through the second passage. According to another aspect of the present invention, therefore, the flow rate of the fluid flowing between the hydraulic source and the clutch device is increased when the stopping engine is restarted and when the clutch device is brought into disengagement so that hydraulic response of the clutch device can be improved. In addition, the communication between the hydraulic source and the clutch device through the second passage is established only by actuating the solenoid valve arranged on the second passage. Therefore, the delivery line between the hydraulic source and the clutch device through the second passage can be established smoothly without interrupting the connection therebetween.

Specifically, the communication between the hydraulic source and the clutch device through the second passage is established when the shift position of the transmission is shifted from the drive position to the neutral position. That is, when the neutral position is selected, the clutch device is brought into disengagement, and the hydraulic source is connected to the clutch device through both the first and the second passages. In this situation, therefore, the clutch device can be brought into disengagement promptly so that the drive mode of the vehicle can be shifted to the neutral mode smoothly.

According to still another aspect of the present invention, when the engine is stopped automatically, the hydraulic source is connected to the clutch device through the diametrically larger passage on which the orifice having a larger diameter is formed. By contrast, when the engine is activated, the hydraulic source is connected to the clutch device through the diametrically smaller passage on which the orifice having a smaller diameter is formed. According to still another aspect of the present invention, therefore, the flow rate of the fluid flowing between the hydraulic source and the clutch device is increased when the engine is stopped so that hydraulic response of the clutch device can be improved without degrading the hydraulic response of the clutch device of the case in which the engine is activated.

DESCRIPTION OF THE PREFERRED EMBODIMENT(S)

Figure 1:
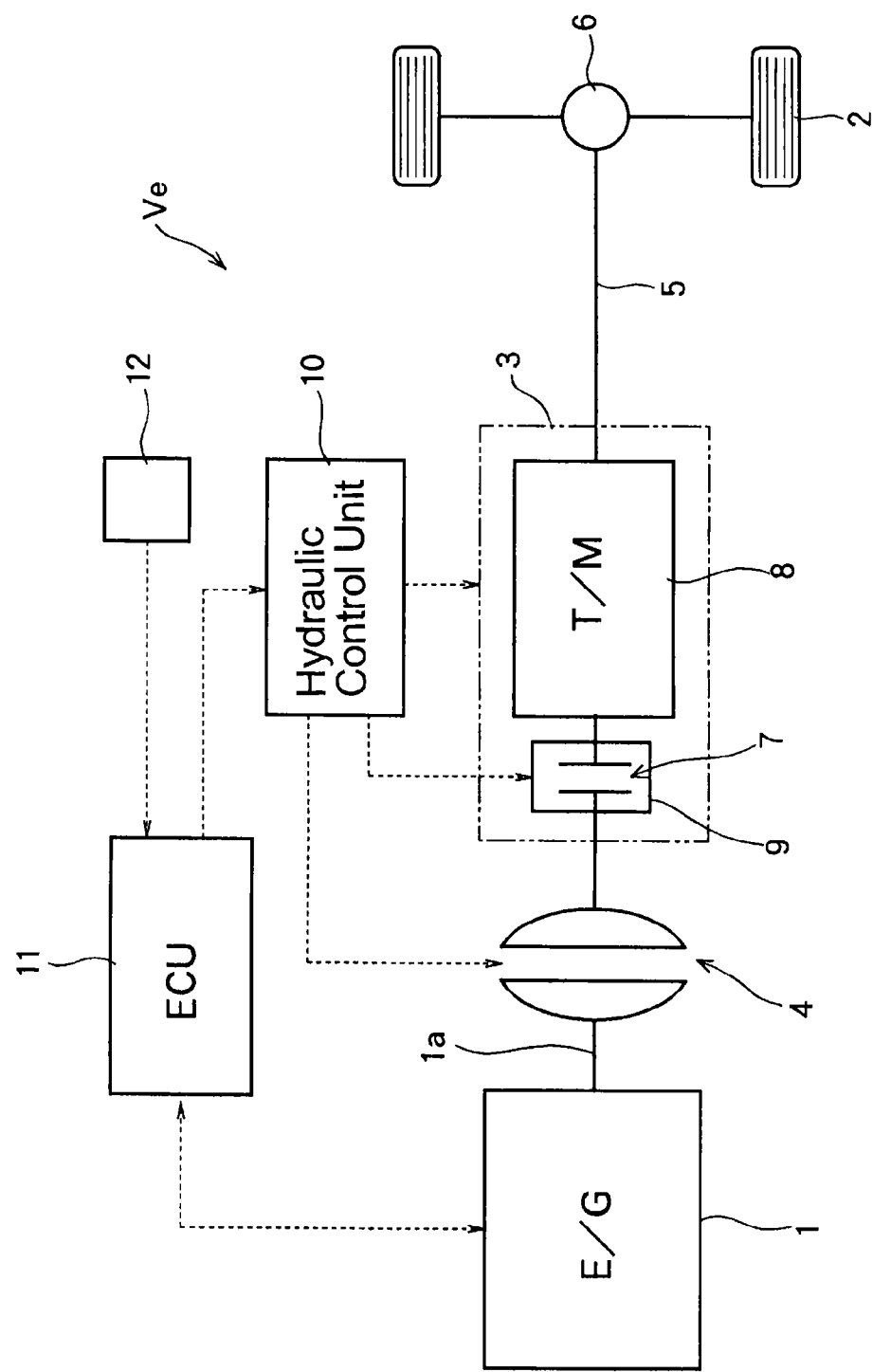
FIG. 1 is a view schematically showing one example of a powertrain and a control system of the vehicle to which the present invention is applied.

Next, preferred examples of the hydraulic control system will be explained with reference to the accompanying drawings. FIG. 1 shows a powertrain and a control system of the vehicle to which the hydraulic control system of the present invention is applied. In the vehicle Ve illustrated in FIG. 1, an automatic transmission 3 is connected to an output shaft 1a of an engine 1 through a torque converter 4. An output side of the transmission 3 also connected to drive wheels 2 through a driveshaft 5 and a differential gear unit 6 etc.

The engine 1 serves as a prime mover of the vehicle Ve, and for example, an internal combustion engine such as a gasoline engine, a diesel engine a natural gas engine and etc. may be used as the engine 1. According to the example shown in FIG. 1, the gasoline engine is used as the engine 1, and the engine 1 is comprised of an electronic throttle valve an opening degree thereof is controlled electrically, and a fuel injector an injecting amount thereof is controlled electrically. Therefore, the engine 1 can be operated in an optimally fuel efficient manner by electrically controlling a rotational speed with respect to a predetermined load.

The transmission 3 is adapted to transmit torque of the engine 1 to the drive wheels 2 while carrying out a speed change. For example, a geared automatic transmission (AT), a belt-driven or toroidal continuously variable transmission (CVT), a dual-clutch automatic transmission (DCT) based on a geared manual transmission, an automatic clutch manual transmission (AMT) and so on may be used as the transmission 3. The vehicle Ve is further provided with a clutch 7 adapted to selectively allow a power transmission between the engine 1 and the drive wheels 2, irrespective of type of the transmission 3.

According to the example shown in FIG. 1, the belt-driven CVT is used as the transmission 3. Specifically, the transmission 3 includes a belt-driven transmission 8 and a torque reversing device 9 for reversing a direction of the torque transmitted to the drive wheels 2 between forward and backward directions. The torque reversing device 9 is comprised of a forward clutch engaged to establish the forward stage and a reverse clutch engaged to establish the reverse stage. Those forward and reverse clutches serve as a claimed clutch device 7. A gear stage of the transmission 3 is shifted between the forward stage and the reverse stage by selectively bringing the forward clutch or the reverse clutch into engagement. The transmission 3 is brought into neutral state where power transmission to/from the engine 1 is interrupted by bringing the clutch device 7 (i.e., both forward and reverse clutches) into disengagement.

Conventional geared AT is comprised of a plurality of planetary gear unit, a forward clutch engaged to establish the forward stage, a reverse clutch engaged to establish the reverse stage, and an optional clutch or brake for establishing an optional forward stage. Given that the geared AT thus structured is used as the transmission 3, the transmission 3 is brought into the neutral stage by bringing all of the forward and reverse clutches into disengagement. In this case, those forward clutch(es) and reverse clutch serve as the claimed clutch device.

Given that the DCT is used as the transmission 3, the power transmission between the engine 1 and the transmission 3 is interrupted by bringing both of the clutches of the DCT into disengagement. That is, the transmission 3 is brought into the neutral state. In this case, the two clutches of the DCT serve as the claimed clutch device.

Given that the AMT is used as the transmission 3, the power transmission between the engine 1 and the transmission 3 is interrupted by bringing a clutch disposed between a conventional manual transmission device and the engine 1 into disengagement. That is, the transmission 3 is brought into the neutral state. In this case, the above-explained clutch serves as the claimed clutch device.

In order to hydraulically control the transmission 3 and a lockup clutch (not shown) of a torque converter 4, the vehicle Ve is provided with a hydraulic control unit 10. The hydraulic control unit is comprised of after-mentioned oil pump 21 and accumulator 22, and connected to the transmission 3, the clutch device 7, and the lockup clutch of the torque converter 4. Therefore, a speed change operation and a clamping pressure of the belt-driven transmission 8, actuation of the clutch device 7 and the lockup clutch and so on are controlled by hydraulic pressure established by the hydraulic control unit 10.

In order to electrically control the engine 1 and the hydraulic control unit 10, the vehicle Ve is provided with an electronic control unit (ECU) 11 as a microcomputer that is configured to carry out a calculation based on input data and preinstalled data, and to transmit a calculation result in the form of a command signal. For example, detection signals from an accelerator sensor (or an accelerator switch) adapted to detect a depression angle or a depression amount of an accelerator pedal, a brake sensor (or a brake switch) adapted to detect a depression angle or a depression amount of a brake pedal, an engine speed sensor adapted to detect a speed of the engine 1, and so on are sent to the ECU 11. Based on those signals, the ECU 11 sends a command signals to the engine 1 to control the operating condition, and to the hydraulic control unit 10 to control a speed change operation and actuation of the clutch device 7.

In the vehicle Ve thus structured, so-called "S & S" control can be carried out to automatically stop and to restart the engine 1 upon satisfaction of predetermined conditions to reduce fuel consumption and emissions. Under the S & S control, for example, the engine 1 is stopped when the vehicle is stopped by depressing a brake pedal or when an accelerator pedal is returned during decelerating the vehicle. By contrast, the engine 1 is restarted when the brake pedal is returned or when the accelerator pedal is depressed. Since the S & S control is well known in the art, further explanations therefore is believed to be unnecessary.

Under the S & S control, specifically, the engine 1 is stopped automatically when the vehicle waits at a traffic light or when the vehicle is decelerated. However, when stopping the engine 1, vibrations and shocks would be caused by a change in the output torque of the engine 1. In order to avoid transmission of such vibrations to the powertrain, the clutch device 7 is brought into disengagement when stopping the engine 1 by the S & S control. Likewise, such torque change is also caused when the engine 1 is restarted. Therefore, the clutch device 7 will be brought into engagement after the completion of startup of the engine 1.

Figure 2:
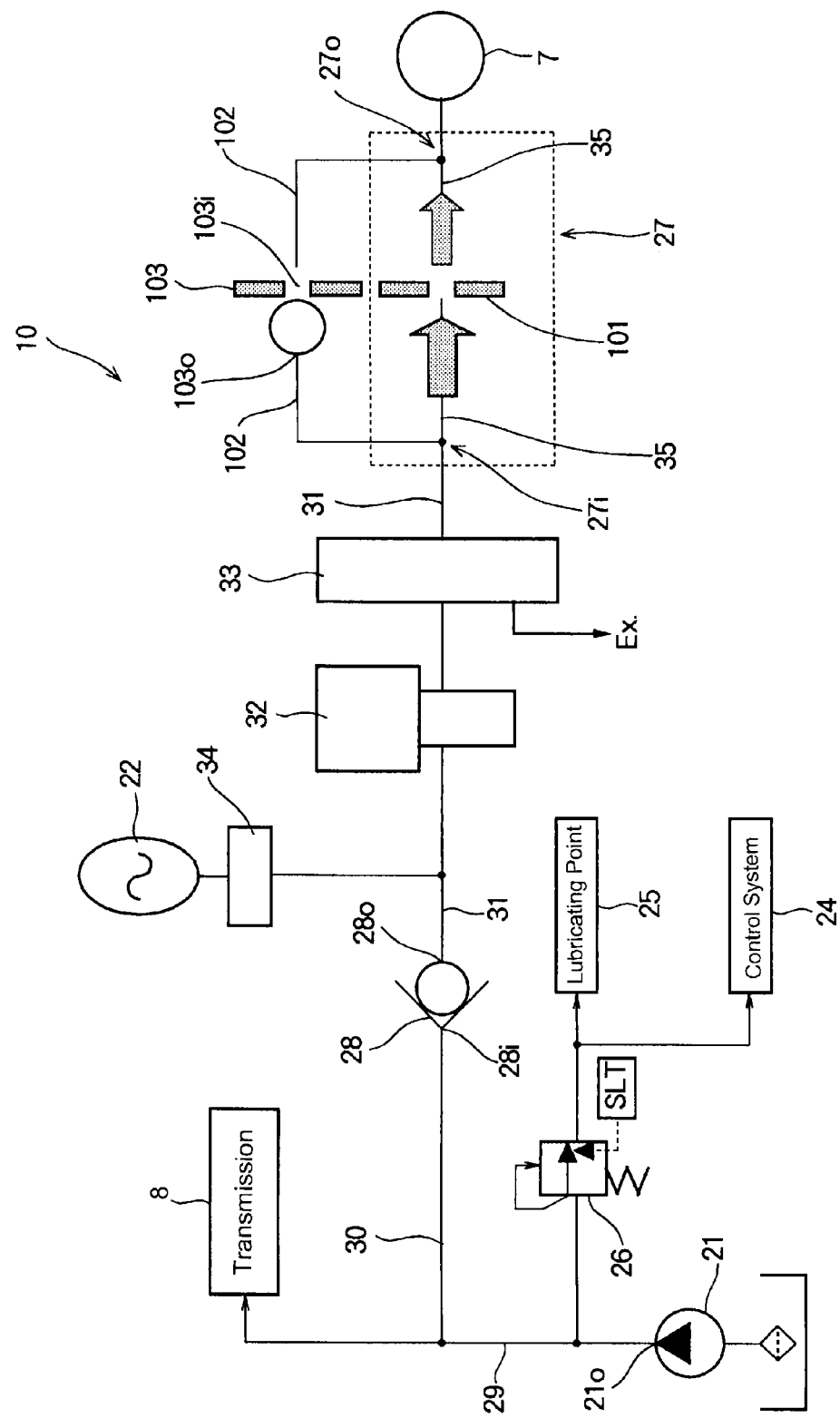
FIG. 2 is a view schematically showing one example of a configuration of the hydraulic control system according to the present invention.

Referring now to FIG. 2, there is shown a structure of the hydraulic control unit 10 adapted to control actuation of the clutch device 7. As described, the hydraulic control unit is provided with the mechanical oil pump 21 and the accumulator 22 functioning as hydraulic sources. The oil pump 21 is driven by the output torque of the engine 1 to generate hydraulic pressure, and the accumulator 22 stores hydraulic fluid during operation of the oil pump 21. When the oil pump 21 is inactivated by stopping the engine 1, the accumulator discharges the hydraulic fluid according to need.

The hydraulic control unit 10 comprises a first hydraulic line for delivering pressurized fluid from the oil pump 21 to the belt-driven transmission 8, a second hydraulic line for delivering pressurized fluid from the oil pump 21 to a lubrication point 25 and a control system 24 for the lockup clutch, and a third hydraulic line for delivering pressurized fluid from the oil pump 21 to the clutch device 7. Accordingly, a speed change operation and a clamping pressure of the belt-driven transmission 8 are controlled by controlling the pressurized fluid delivered thereto through the first hydraulic line. Likewise, an actuation of the lockup clutch is controlled by controlling the pressurized fluid delivered to the control system 24 through the second hydraulic line while regulating pressure by a primary regulator valve 26. The hydraulic fluid is also delivered to the lubricating point 25 of the belt-driven transmission 8 through the second hydraulic line. In turn, an actuation of the clutch device 7 is controlled by controlling the pressurized fluid delivered thereto through the third hydraulic line.

The third hydraulic line includes a hydraulic circuit 27. Specifically, a discharge port 210 of the oil pump 21 is connected to a suction port 28*i* of a check valve 28 through a passage 29 and a passage 30, and an outlet port 28*o* of the check valve 28 is connected to an inlet 27*i* of the hydraulic circuit 27 through a passage 31. An outlet 27*o* of the hydraulic circuit 27 is connected to the clutch device 7. In addition, a clutch control valve 32 and a manual valve 33 are disposed in order on the passage 31. The accumulator 22 is connected to the passage 31 between the check valve 28 and the clutch control valve 32.

The check valve 28 is adapted to allow the fluid to flow only from the suction port 28*i* toward the outlet port 28*o*. That is, the fluid flowing through the passage 31 is not allowed to flow backwardly toward the oil pump 21 from the check valve 28.

A solenoid valve is used as the clutch control valve 32 to control an engagement pressure of the clutch device 7. Specifically, the clutch control valve 32 is adapted to regulate the pressurized fluid from the oil pump 21 and to allow the regulated fluid to flow toward the clutch device 7. In turn, the manual valve 33 is adapted to selectively connect the clutch control valve 32 to the clutch device 7 in accordance with the shift position of the transmission 3. For example, given that any of a drive (D) position, a low (L) position, and a reverse (R) position is selected, the manual valve 33 provides a connection between the clutch control valve 32 and the clutch device 7 to deliver the fluid to the clutch device 7. By contrast, given that a neutral (N) position is selected, the manual valve 33 connects the clutch device 7 to a drain site to allow the clutch device 7 to discharge the fluid therefrom.

Specifically, the accumulator 22 is connected to the passage 31 through an accumulator control valve 34 as a solenoid valve adapted to selectively provide a connection between the accumulator 22 and the passage 31 so as to allow the fluid to be discharged from the accumulator 22 and to be stored into the accumulator 22. Specifically, the pressurized fluid in the accumulator 22 is confined therein by closing the accumulator control valve 34. By contrast, the fluid is allowed to be discharged from the accumulator 22 and to be stored in the accumulator 22 by opening the accumulator control valve 34.

Thus, the hydraulic control system 10 is provided with the accumulator 22 in addition to the oil pump 21 driven by the engine 1. According to the preferred example, therefore, the clutch 7 can be actuated by controlling the accumulator control valve 34 to selectively deliver the fluid thereto even if the oil pump 21 is inactivated by stopping the engine 1.

The hydraulic circuit 27 is adapted to properly deliver and drain the fluid to/from the clutch device 7. In the hydraulic control system 10 shown in FIG. 2, a conventional hydraulic circuit is used as the hydraulic circuit 27 and the feature of the present invention is not applied thereto. In the conventional hydraulic circuit shown in FIG. 2, the passage 31 on which the clutch control valve 32 and the manual valve 33 are disposed is connected to the clutch device 7 through the passage 35, and an orifice 101 is formed on the passage 35. A passage 102 also extends parallel to the passage 35 to connect the passage 31 to the clutch device 7, and a one-way orifice 103 is formed on the passage 102.

The orifice 101 is formed to prevent to transmit hydraulic vibrations and pulses resulting from controlling the pressurized fluid by the clutch control valve 32 to the clutch device 7. To this end, a diameter of the orifice 101 is optimized to control flow rate of the fluid flowing therethrough in a manner to suppress the hydraulic vibrations and pulses.

An inlet port 103*i* of the one-way orifice 103 is connected to the passage 102 of the clutch device 7 side, and an outlet port 103*o* of the one-way orifice 103 is connected to the passage 102 of the oil pump 21 side. The one-way orifice 103 is adapted to regulate the flowrate of the fluid only in the direction from the inlet port 103*i* toward the outlet port 103*o*. That is, the one-way orifice 103 is opened only by the fluid drained from the clutch device 7 to allow the fluid to flow into the passage 102. Accordingly, the pressurized fluid delivered to engage the clutch device 7 is allowed to be drained from the clutch device 7 not only through the passage 35 but also through the passage 102. For this reason, drainage rate of the fluid from the clutch device 7 can be increased so that the clutch device 7 can be brought into disengagement quickly.

Thus, according to the conventional hydraulic circuit having the orifices 101 and 103, the hydraulic vibrations and pulses caused by the clutch control valve 32 can be prevented by the orifice 101 on the passage 35 to be transmitted to the clutch device 7. However, the flow rate of the fluid delivered to the clutch device 7 has to be reduced by the orifice 101. In the conventional hydraulic circuit thus structured, therefore, an engagement response of the clutch device 7 would be degraded under the situation that the engine 1 is stopped and the accumulator 22 serves as a hydraulic source.

As described, in the conventional hydraulic circuit, the fluid can be discharged from the clutch device 7 though the passage 102 on which the one-way orifice 103 is formed and the passage 102. In this situation, however, the flow rate of the fluid is also restricted by the orifice 101 as the case of delivering the fluid to the clutch device 7. For this reason, a response to bring clutch device 7 into disengagement would also be degraded.

In order to avoid such disadvantages, according to the preferred example, the hydraulic circuit 27 is adapted to increase flow rate of the fluid flowing between the accumulator 22 and the clutch device 7 when the engine 1 is stopped to be larger than that of a case in which the engine 1 is activated. Preferred example of the hydraulic circuit 27 will be explained with reference to FIGS. 3, 4 and 5.

FIRST EXAMPLE

Figure 3:
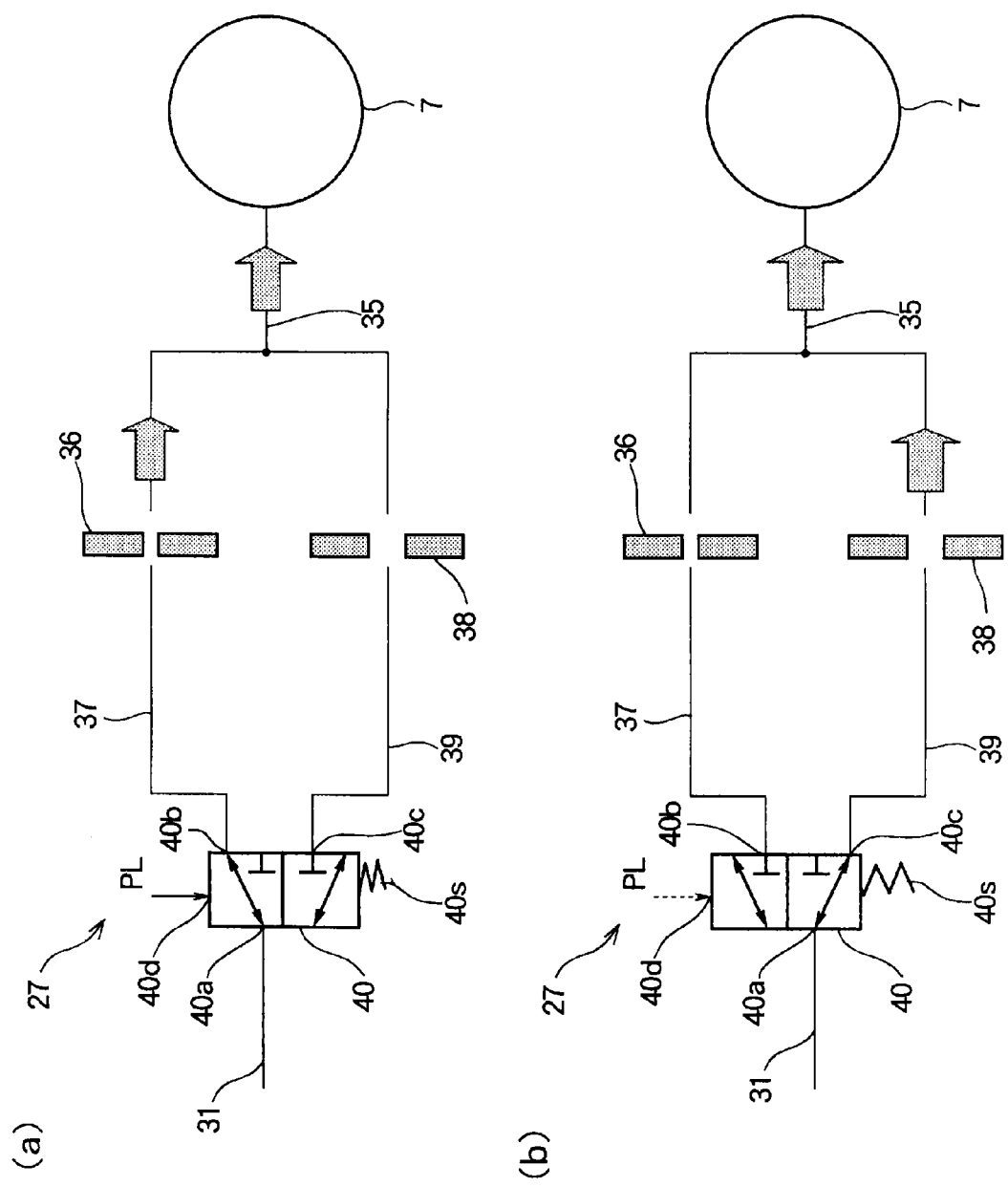
FIG. 3 is a view schematically showing one example of a hydraulic circuit of the hydraulic control system.

According to the first example illustrated in FIG. 3, the hydraulic circuit 27 is comprised of a passage 37 on which an orifice 36 is formed, a passage 39 on which an orifice 38 is formed, and a change valve 40 adapted to selectively provide a connection between the passage 37 and the passage 31 and between the passage and the passage 31. Those passages 37 and 39 are arranged parallel to each other between the passage 31 on which the clutch control valve 32 and the manual valve 33 are disposed and the passage 35 connected to the clutch device 7, and both leading ends of the passages 37 and 39 of the clutch device 7 side are connected to the passage 35. Leading ends of the passages 37 and 39 of the other side are connected to the passage 31 through the change valve 40.

A structure of the orifice 36 is similar to that of the aforementioned conventional orifice 101, and a diameter of the orifice 36 is optimized to suppress hydraulic vibrations and pulses caused by the clutch control valve 32. On the other hand, the orifice 38 is formed to have a larger diameter than that of the orifice 36. That is, flow rate of the fluid flowing through the passage 39 is larger than that of the fluid flowing through the passage 37.

The change valve 40 is comprised of a first port 40a connected to the passage 31, a second port 40b connected to the passage 37, a third port 40c connected to the passage 39, a signal port 40d to which a signal pressure is applied, and a spring 40s elastically pushing a (not shown) spool. Given that the hydraulic pressure is not applied to the signal port 40d and hence the spool is pushed only by the spring 40s, a communication between the first port 40a and the third port 40c is established, and the second port 40b is closed.

In order to counteract to the elastic force of the spring 40s, a line pressure established by regulating the hydraulic pressure of the oil pump 21 by the primary regulator valve 26, or a solenoid modulator pressure regulated by another solenoid valve is applied to the signal port 40d of the change valve 40. In case the line pressure or the solenoid modulator pressure is applied to the signal port 40d, a communication between the first port 40a and the second port 40b is established, and the third port 40c is closed.

Specifically, the line pressure or the solenoid modulator pressure is applied to the signal port 40d when the oil pump 21 is driven by the engine 1 in activation to generate hydraulic pressure, and consequently a communication between the passage 31 and the passage 37 is established as illustrated in FIG. 3 (a). In this case, the hydraulic pressure generated by the oil pump 21 is regulated by the clutch control valve 32 to an engagement pressure, and then delivered to the clutch device 7 through the passage 31, the passage 37, the orifice 36 and the passage 35. In the hydraulic control system 10 thus having the hydraulic circuit 27 of the first example, therefore, the vibrations and pulses of the fluid delivered from the oil pump 21 to the clutch 7 caused by the clutch control valve 32 as a solenoid valve can be suppressed so that the clutch device 7 can be controlled smoothly.

By contrast, when the engine 1 and the oil pump 21 are inactivated, none of the hydraulic pressure is applied to the signal port 40d of the change valve 40, and consequently a communication between the passage 31 and the passage 39 is established as illustrated in FIG. 3 (b). In this case, the fluid discharged from the accumulator 22 is regulated by the clutch control valve 32 to an engagement pressure, and then delivered to the clutch device 7 through the passage 31, the passage 39, the orifice 38 and the passage 35. In the hydraulic control system 10 thus having the hydraulic circuit 27 of the first example, therefore, an ample amount of the fluid can be delivered to the clutch device 7 from the accumulator 22 even when the engine 1 is inactivated. In this case, therefore, hydraulic response of the clutch device 7 can be improved so that the clutch device 7 can be bought into engagement quickly.

That is, in the hydraulic control system 10 thus having the hydraulic circuit 27 shown in FIG. 3, the accumulator 22 is connected to the clutch device 7 through the passage 39 when the engine 1 is stopped by the S & S control. In this case, therefore, the fluid can be delivered from the accumulator 22 to the clutch device 7 in an ample amount through the diametrically larger orifice 38 formed on the passage 39. By contrast, when the engine 1 is activated, the accumulator 22 is connected to the clutch device 7 through the passage 37 so that the vibrations and pulses of the fluid is suppressed by the diametrically smaller orifice 36 formed on the passage 37. According to the first example, therefore, hydraulic response of the clutch device 7 can be improved when the engine 1 is inactivated by allowing the fluid to be delivered to the clutch device 7 in an ample amount, without degrading the hydraulic response of the clutch device 7 of the case in which the engine 1 is activated.

SECOND EXAMPLE

Figure 4:
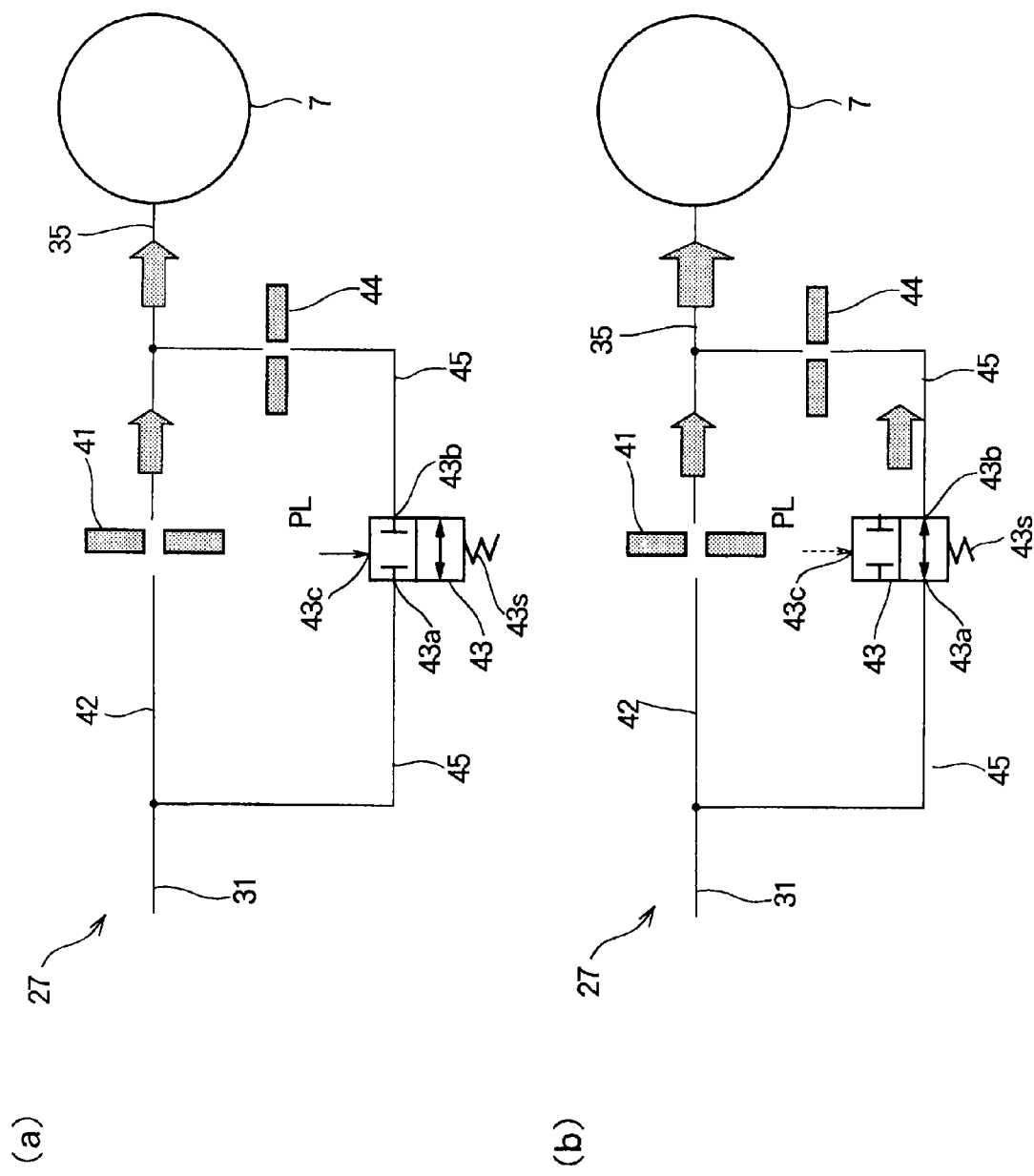
FIG. 4 is a view schematically showing another example of the hydraulic circuit of the hydraulic control system.

According to the second example illustrated in FIG. 4, the hydraulic circuit 27 is comprised of a passage 42 on which an orifice 41 is formed, and a passage 45 on which an on-off valve 43 is disposed and an orifice 44 is formed. Those passages 42 and 45 are arranged parallel to each other between the passage 31 on which the clutch control valve 32 and the manual valve 33 are disposed and the passage 35 connected to the clutch device 7, and both leading ends of the passages 42 and 45 of the manual valve 33 side are connected to the passage 31. Leading ends of the passages 42 and 45 of the clutch device 7 side are connected to the passage 35.

A structure of the orifice 41 is also similar to that of the aforementioned conventional orifice 101, and a diameter of the orifice 41 is optimized to suppress hydraulic vibrations and pulses caused by the clutch control valve 32. On the other hand, a diameter of the orifice 44 is optimized to ensure sufficient flow rate of the fluid flowing therethrough to actuate the clutch device 7 quickly together with the fluid flowing toward the clutch device 7 through the orifice 41.

The on-off valve 43 is comprised of a first port 43*a* connected to the passage 31 through the passage 45, a second port 43*b* connected to the passage 35 through the passage 45 and the orifice 44, a signal port 43*c* to which a signal pressure is applied, and a spring 43*s* elastically pushing a (not shown) spool. Given that the hydraulic pressure is not applied to the signal port 43*c* and hence the spool is pushed only by the spring 43*s*, a communication between the first port 43*a* and the second port 43*b* is established.

In order to counteract to the elastic force of the spring 43*s*, a line pressure established by regulating the hydraulic pressure of the oil pump 21 by the primary regulator valve 26, or a solenoid modulator pressure regulated by another solenoid valve is applied to the signal port 43*c* of the on-off valve 43. In case the line pressure or the solenoid modulator pressure is applied to the signal port 43*c*, a communication between the first port 43*a* and the second port 43*b* is interrupted.

Specifically, the line pressure or the solenoid modulator pressure is applied to the signal port 43*c* of the on-off valve 43 when the oil pump 21 is driven by the engine 1 in activation to generate hydraulic pressure, and consequently the passage 45 is closed by the on-off valve 43 as illustrated in FIG. 4 (*a*). In this case, the hydraulic pressure generated by the oil pump 21 is regulated by the clutch control valve 32 to an engagement pressure, and then delivered to the clutch device 7 through the passage 31, the passage 42, the orifice 41 and the passage 35. In the hydraulic control system 10 thus having the hydraulic circuit 27 of the second example, therefore, the vibrations and pulses of the fluid delivered from the oil pump 21 to the clutch 7 caused by the clutch control valve 32 as a solenoid valve can be suppressed when the engine 1 in activation so that the clutch device 7 can be controlled smoothly.

By contrast, when the engine 1 and the oil pump 21 are inactivated, none of the hydraulic pressure is applied to the signal port 43*c* of the on-off valve 43, and consequently a communication between the passage 31 and the passage 35 through the passage 45 and the orifice 44 is established as illustrated in FIG. 4 (*b*). In this case, the fluid discharged from the accumulator 22 is regulated by the clutch control valve 32 to an engagement pressure, and then delivered to the clutch device 7 not only through the passage 31, the passage 42, the orifice 41 and the passage 35, but also through the passage 31, the passage 45, the orifice 44 and the passage 35. In the hydraulic control system 10 thus having the hydraulic circuit 27 of the second example, therefore, an ample amount of the fluid can be delivered to the clutch device 7 from the accumulator 22 even when the engine 1 is inactivated. In this case, therefore, hydraulic response of the clutch device 7 can be improved so that the clutch device 7 can be bought into engagement quickly.

That is, in the hydraulic control system 10 thus having the hydraulic circuit 27 shown in FIG. 4, the accumulator 22 is connected to the clutch device 7 when the engine 1 is stopped by the S & S control through both delivery lines formed by the passage 31, the passage 42, the orifice 41 and the passage 35, and formed by the passage 31, the passage 45, the orifice 44 and the passage 35. That is, when the engine 1 is activated, the accumulator 22 is connected to the clutch device 7 only through the passage 42 on which the orifice 41 is formed. By contrast, when the engine 1 is stopped automatically, the accumulator 22 is connected to the clutch device 7 through the passage 45 in addition to the passage 42 that provides a connection therebetween on the constant basis. According to the second example, therefore, hydraulic response of the clutch device 7 can be improved when the engine 1 is inactivated by allowing the fluid to be delivered to the clutch device 7 through the two delivery lines, without degrading the hydraulic response of the clutch device 7 of the case in which the engine 1 is activated.

In addition, according to the hydraulic control system 10 having the hydraulic circuit 27 of the second example, the communication between the accumulator 22 and the clutch device 7 through the passage 45 is established only by opening the on-off valve 43. Therefore, the connection between the accumulator 22 and the clutch device 7 through the passage 45 can be established smoothly without interrupting the connection therebetween through the passage 42.

THIRD EXAMPLE

Figure 5:
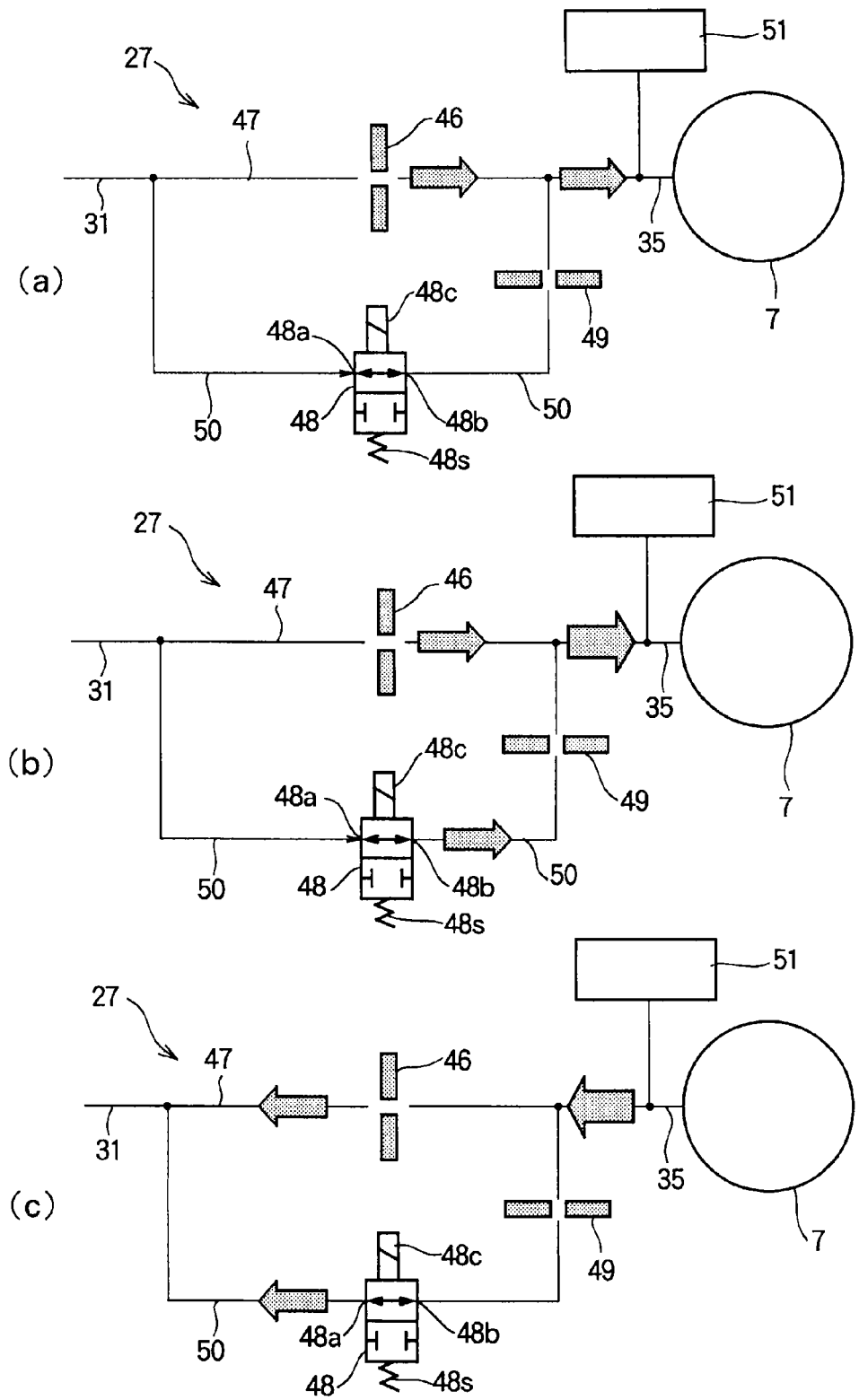
FIG. 5 is a view schematically showing still another example of the hydraulic circuit of the hydraulic control system.

According to the third example illustrated in FIG. 5, the hydraulic circuit 27 is comprised of a passage 47 on which an orifice 46 is formed, and a passage 50 on which a solenoid valve 48 is disposed and an orifice 49 is formed. Those passages 47 and 50 are arranged parallel to each other between the passage 31 on which the clutch control valve 32 and the manual valve 33 are disposed and the passage 35 connected to the clutch device 7, and both leading ends of the passages 47 and 50 of the manual valve 33 side are connected to the passage 31. Leading ends of the passages 47 and 50 of the clutch device 7 side are connected to the passage 35. In addition, a pressure gauge 51 is disposed on the passage 35 to measure pressure of the fluid to engage the clutch device 7.

A structure of the orifice 46 is also similar to that of the aforementioned conventional orifice 101, and a diameter of the orifice 46 is optimized to suppress hydraulic vibrations and pulses caused by the clutch control valve 32. On the other hand, a diameter of the orifice 49 is optimized to ensure sufficient flow rate of the fluid flowing therethrough to actuate the clutch device 7 quickly together with the fluid flowing toward the clutch device 7 through the orifice 46.

The solenoid valve 48 is comprised of a first port 48*a* connected to the passage 31 through the passage 50, a second port 48*b* connected to the passage 35 through the passage 50 and the orifice 49, a solenoid 48*c* to which a control current is applied, and a spring 48*s* elastically pushing a (not shown) spool. Given that the solenoid 48*c* is not energized and hence the spool is pushed only by the spring 43*s*, a communication between the first port 48*a* and the second port 48*b* is interrupted. By contrast, given that the solenoid 48*c* is energized, a communication between the first port 48*a* and the second port 48*b* is established. Thus, the solenoid valve 43 is a normal-close type valve that is opened when it is energized and closed when it is not energized.

Specifically, the solenoid valve 48 is not energized when the engine 1 is activated so that the passage 50 is closed by the solenoid valve 48 as illustrated in FIG. 5 (*a*). In this case, the hydraulic pressure generated by the oil pump 21 is regulated by the clutch control valve 32 to an engagement pressure, and then delivered to the clutch device 7 through the passage 31, the passage 47, the orifice 46 and the passage 35. In the hydraulic control system 10 thus having the hydraulic circuit 27 of the third example, therefore, the vibrations and pulses of the fluid delivered from the oil pump 21 to the clutch 7 caused by the clutch control valve 32 as a solenoid valve can be suppressed when the engine 1 in activation so that the clutch device 7 can be controlled smoothly.

By contrast, when the stopping engine 1 is restarted and the oil pump 21 is inactivated, the solenoid valve 48 is energized. Consequently a communication between the passage 31 and the passage 35 through the passage 50 and the orifice 49 is established as illustrated in FIG. 5 (*b*). In this case, the fluid discharged from the accumulator 22 is regulated by the clutch control valve 32 to an engagement pressure, and then delivered to the clutch device 7 not only through the passage 31, the passage 47, the orifice 46 and the passage 35, but also through the passage 31, the passage 50, the orifice 49 and the passage 35. In the hydraulic control system 10 thus having the hydraulic circuit 27 of the third example, therefore, an ample amount of the fluid can be delivered to the clutch device 7 from the accumulator 22 even when the stopping engine 1 is restarted. In this case, therefore, hydraulic response of the clutch device 7 can be improved so that the clutch device 7 can be bought into engagement quickly.

Then, when the clutch device 7 is brought into disengagement by discharging the fluid therefrom, the solenoid valve 48 is also energized as the case of restarting the engine 1. Consequently a communication between the passage 31 and the passage 35 through the passage 50 and the orifice 49 is established as illustrated in FIG. 5 (*c*). In this case, communication between the passage 31 and the drain port is also provided by the manual valve 33. In this situation, therefore, the fluid is discharged from the clutch device 7 not only through the passage 35, the passage 47, the orifice 46 and the passage 31, but also through the passage 35, the passage 50, the orifice 49 and the passage 31. In the hydraulic control system 10 thus having the hydraulic circuit 27 of the third example, therefore, an ample amount of the fluid can be discharged from the clutch device 7 to bring the clutch device 7 into disengagement quickly.

Thus, in the hydraulic control system 10 having the hydraulic circuit 27 shown in FIG. 5, the accumulator 22 is connected to the clutch device 7 only through the passage 47 when the engine 1 is activated. By contrast, when the stopping engine 1 is restarted, the accumulator 22 is connected to the clutch device 7 through the passage 50 in addition to the passage 47 that provides a connection therebetween on the constant basis. According to the third example, therefore, hydraulic response of the clutch device 7 can be improved when the clutch device 7 is in disengagement and the engine 1 is restarted by increasing the flow rate of the fluid delivered from the accumulator 22 to the clutch device 7, without degrading the hydraulic response of the clutch device 7 of the case in which the engine 1 is activated.

In addition, according to the hydraulic control system 10 having the hydraulic circuit 27 of the third example, the delivery lines between the accumulator 22 and the clutch device 7 through the passage 47 and through the passage 50 can be switched only by electrically controlling the solenoid valve 48. That is, the communication between the accumulator 22 and the clutch device 7 through the passage 50 can be established only by energizing the solenoid valve 48. Therefore, the delivery lines between the accumulator 22 can be switched smoothly without cutting off the connection therebetween.

For example, the connection between the accumulator 22 and the clutch device 7 through the passage 50 is established by energizing the solenoid valve 48, when the shift position shifted from the D range to the N range and hence the clutch device 7 is brought into disengagement. Consequently, the accumulator 22 is connected to the clutch device 7 through the passage 47 and the passage 50. For this reason, the transmission 3 can be brought into the neutral stage smoothly when the shift position shifted from the D range to the N range by promptly bringing the clutch device 7 into disengagement.

That is, according to the third example thus using the normal-close type solenoid valve, the delivery lines between the accumulator 22 and the clutch device 7 can be switched promptly according to need irrespective of activation of the oil pump 21. Therefore, a discharging amount of the fluid from the clutch device 7 to be brought into disengagement can also be increased only by energizing the solenoid valve 48. For this reason, the conventional one-way orifice 103 shown in FIG. 2 can be omitted so that the structure of the hydraulic circuit 27 can be simplified.

Thus, in the hydraulic control system according to the preferred examples, the clutch device 7 is hydraulically controlled by the accumulator 22 instead of the oil pump 21 when the engine 1 is stopped by the S & S control. In this case, specifically, the hydraulic control unit 10 increases flow rate of the fluid flowing between the accumulator 22 and the clutch device 7 in comparison with that of the case in which the engine 1 is activated.

According to the present invention, therefore, the clutch device 7 is allowed to be brought into engagement promptly even if the engine 1 is inactivated by increasing the fluid delivered thereto from the accumulator 22. In this case, the clutch device 7 is also allowed to be brought into disengagement promptly by discharging the fluid amply therefrom. By contrast, when the engine 1 is activated, the clutch device 7 can be hydraulically controlled by the oil pump 21 driven by the engine 1. That is, hydraulic response of the clutch device 7 can be ensured not only when the engine 1 is activated but also when the engine 1 is inactivated.

The invention claimed is:

1. A hydraulic control system for a vehicle, comprising:
   an engine;
   an oil pump that is driven by the engine to generate hydraulic pressure;
   a clutch device that is brought into engagement to enable power transmission between the engine and drive wheels by delivering a pressurized fluid thereto, and brought into disengagement to interrupt the power transmission between the engine and the drive wheels by discharging the fluid therefrom;
   an accumulator that stores the fluid delivered to the clutch device;
   wherein the hydraulic control system is configured to:
   control the hydraulic pressure established by the oil pump or the accumulator serving as a hydraulic source that is delivered and discharged to/from the clutch device,
   stop the engine while bringing the clutch device into disengagement upon satisfaction of a predetermined stopping condition, and
   restart the engine while bringing the clutch device into engagement upon satisfaction of a predetermined restarting condition; and
   the hydraulic control system comprising a hydraulic circuit configured to increase flow rate of the fluid flowing between the hydraulic source and the clutch device when the engine is stopped, in comparison with that of the case in which the engine is activated;
   wherein the hydraulic circuit comprises:
   a first passage always connecting the hydraulic source to the clutch device to allow the fluid to be delivered from the hydraulic source to the clutch device, and to be discharged from the clutch device;
   a second passage selectively connecting the hydraulic source to the clutch device to allow the fluid to be delivered from the hydraulic source to the clutch device, and to be discharged from the clutch device; and a solenoid valve to close the second passage when the engine is activated, and to open the second passage when restarting the stopped engine while bringing the clutch device into disengagement to establish a communication between the hydraulic source and the clutch device through the first passage and the second passage.

2. The hydraulic control system as claimed in claim 1, wherein the hydraulic circuit comprises:

an on-off valve to close the second passage when the engine is activated, and to open the second passage when the engine is stopped to establish a communication between the hydraulic source and the clutch device through the first passage and the second passage.

3. The hydraulic control system as claimed in claim 1, wherein the vehicle comprises an automatic transmission in which a drive position and a neutral position are selectable; and wherein the solenoid valve is configured to open the second passage when a shift position of the transmission is shifted from the drive position to the neutral position.

4. A hydraulic control system for a vehicle, comprising:
an engine;
an oil pump that is driven by the engine to generate hydraulic pressure;
a clutch device that is brought into engagement to enable power transmission between the engine and drive wheels by delivering a pressurized fluid thereto, and brought into disengagement to interrupt the power transmission between the engine and the drive wheels by discharging the fluid therefrom;

an accumulator that stores the fluid delivered to the clutch device;

wherein the hydraulic control system is configured to:
control the hydraulic pressure established by the oil pump or the accumulator serving as a hydraulic source that is delivered and discharged to/from the clutch device,
stop the engine while bringing the clutch device into disengagement upon satisfaction of a predetermined stopping condition, and
restart the engine while bringing the clutch device into engagement upon satisfaction of a predetermined restarting condition; and
the hydraulic control system comprising a hydraulic circuit configured to increase flow rate of the fluid flowing between the hydraulic source and the clutch device when the engine is stopped, in comparison with that of the case in which the engine is activated;

wherein the hydraulic circuit comprises:
a diametrically smaller passage to deliver the fluid from the hydraulic source to the clutch device and to discharge the fluid from the clutch device on which a first orifice is formed;
a diametrically larger passage to deliver the fluid from the hydraulic source to the clutch device and to discharge the fluid from the clutch device on which a second orifice that is diametrically larger than the first orifice is formed; and
a change valve to close the diametrically larger passage when the engine is activated while establishing a communication between the hydraulic source and the clutch device through the diametrically smaller passage, and to close the diametrically smaller passage when the engine is stopped while establishing a communication between the hydraulic source and the clutch device through the diametrically larger passage.

* * * * *